United States Patent [19]
Schmeichel et al.

[11] Patent Number: 5,174,353
[45] Date of Patent: Dec. 29, 1992

[54] APPARATUS FOR COVERING AN OPENING DEFINED IN A STRUCTURE

[75] Inventors: Steven C. Schmeichel; Charles M. Schmeichel, both of Jamestown, N. Dak.

[73] Assignee: Agri-Cover, Inc., Courtenay, N. Dak.

[21] Appl. No.: 802,071

[22] Filed: Dec. 3, 1991

Related U.S. Application Data

[63] Continuation of Ser. No. 644,813, Jan. 23, 1991, Pat. No. 5,076,338, which is a continuation-in-part of Ser. No. 311,142, Feb. 15, 1989, abandoned.

[51] Int. Cl.$^5$ .............................................. E06B 9/00
[52] U.S. Cl. .................................. 160/368.1; 160/328
[58] Field of Search ................... 160/368.1, 328, 387, 160/395, 378; 296/100; 52/273, 222; 292/209, 303, DIG. 29, 249, 107

[56] References Cited

U.S. PATENT DOCUMENTS

| 1,500,091 | 7/1924 | Weiske et al. | |
| 4,036,521 | 7/1977 | Clenet | |
| 4,272,119 | 6/1981 | Adams | |
| 4,757,854 | 7/1988 | Rippberger | |
| 4,817,699 | 4/1989 | Fein | 160/328 X |
| 4,838,602 | 6/1989 | Nett | |
| 5,076,338 | 12/1991 | Schmeichel et al. | 160/368.1 |

OTHER PUBLICATIONS

Copy of sample sheet for Tonneau-tex standard black cover sample from Bruin Plastics Co., Inc., of Glendale, R.I. (Exhibit A).
Copy of a sample sheet for a tonneau fabric, elk grain, from The Haartz Corporation of Acton, Mass. (Exhibit B).
One-page "Tailored Seat and Tonneau Covers" ad by Performance Covers of Concord, Calif., published Nov. 1988 in *Truckin* (Exhibit C).
One-page extang ad by extang Corporation of Ann Arbor, Mich. (Exhibit D).
Tonneau cover ad by Pannon Products, Inc., of Wolcott, Conn. (Exhibit E).
Bestop Inc. ad for covers for automobiles, p. 61, (Exhibit F).
Bestop Inc. price list for automobile parts, p. 107 (Exhibit G).
Two page excerpt from catalog featuring covers (Exhibit H).
One page ad for snapless custom-fit convertible tops (Exhibit I).
One-page excerpt from catalog for Supertop TM by Bestop Inc., 1987 (Exhibit J).

*Primary Examiner*—Blair M. Johnson
*Attorney, Agent, or Firm*—Merchant, Gould, Smith, Edell, Welter & Schmidt

[57] ABSTRACT

A cover (10) including a generally L-shaped end plate (20) for stretching and fastening the cover (10) to a frame structure (30). End plate (20) is lockable into a fixed, stretching position with respect to the frame structure (30). Different locking arrangements for accomplishing this are disclosed. Structure (160) is provided for mounting the frame structure (30) to the box of a pickup truck or an equivalent apparatus. Structure is also provided for preventing the cover (10) from ballooning during use.

21 Claims, 8 Drawing Sheets

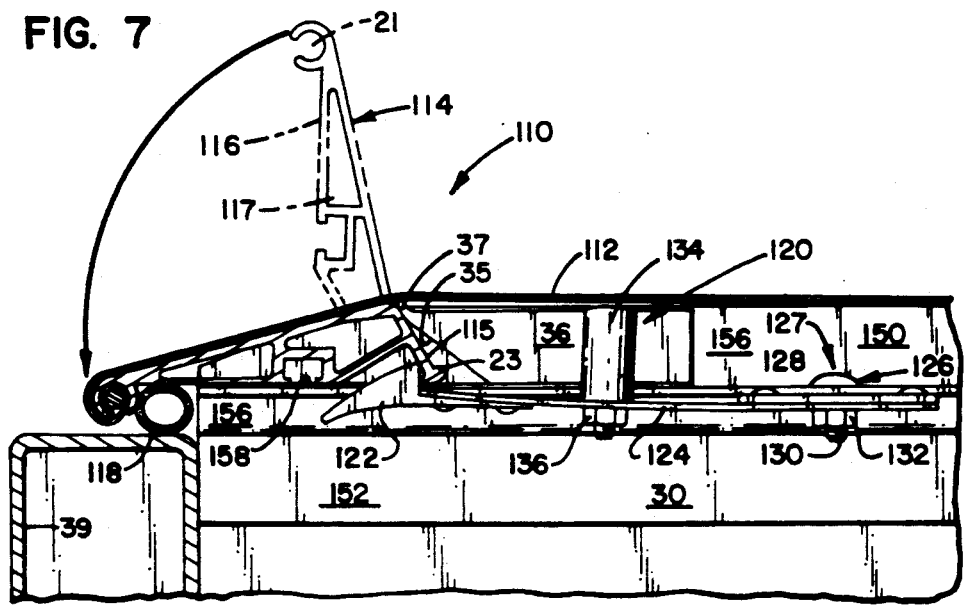
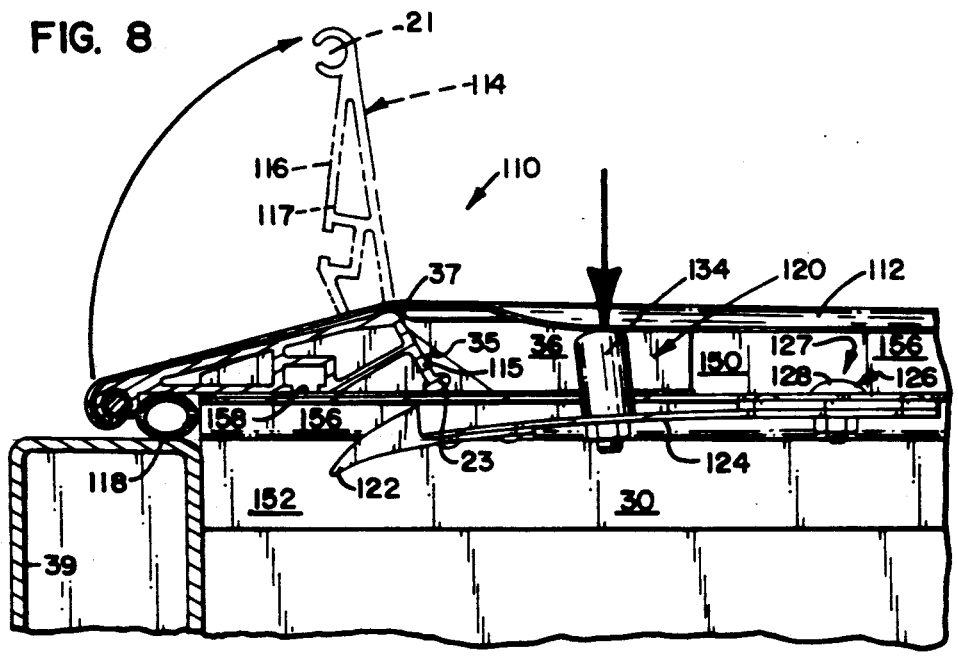

APPARATUS FOR COVERING AN OPENING DEFINED IN A STRUCTURE

REFERENCE TO RELATED APPLICATIONS

This application is a continuation of U.S. Pat. application Ser. No. 644,813, filed on Jan. 23, 1991, now issued as U.S. Pat. No. 5,076,338 on Dec. 31, 1991, which is a continuation-in-part of U.S. Pat. application Ser. No. 311,142, filed on Feb. 15, 1989, now abandoned.

BACKGROUND OF THE INVENTION

1. Field of the Invention

The present invention relates to a cover apparatus for covering an opening and a fastener apparatus for detachably stretching and fastening the cover apparatus to a frame structure which defines that opening.

2. Description of the Prior Art

Numerous protective covers for preventing rain, debris and wind from disrupting the contents of such places as a pickup truck bed are currently available. Generally, the covers are made of some sort of fabric which is detachably fastenable to a rigid frame so as to enclose and protect a given area. The covering materials used are generally stretchable to the extent that once they are in a position, they are pulled taut and then attached to the frame by numerous methods such as snaps, grommets and anchoring elements, or hook-and-loop fasteners.

The use of hook-and-loop type fasteners to detachably fasten a cover to a rigid frame forms the subject matter of U.S. Pat. No. 4,272,119 issued to one Robert M. Adams. U.S. Pat. No. 4,757,854 issued to Gary R. Rippberger, and the unpatented prior art described in that patent, relate to fastener apparatus. In the Rippberger patent, the end of the covering fabric is attached to a tongue. In engaging the cover, the tongue is slipped into a groove in the rigid frame. The unpatented prior art described in the Rippberger patent also utilizes a tongue-and-groove means of attachment. The Rippberger patent differs from the unpatented prior art in two respects. First, in the Rippberger patent, the width of the tongue is greater than the depth of the groove, which thereby purportedly eases the process of insertion and removal of the tongue from the groove; whereas, in the unpatented prior art, the tongue is completely enclosed by the groove. Second, in the Rippberger patent, the cloth covering only partially covers the tongue surface, which permits the cloth covering to maintain some of its force directed parallel to the tongue; whereas in the unpatented prior art, the tongue is completely encased by the fabric covering and thus the force against that covering tends to loosen the tongue from the groove.

Although the Rippberger patent is seen as an improvement over the unpatented prior art, there still remains several problems with Rippberger which this invention solves. Because of the tongue-and-groove method of attachment utilized in the Rippberger patent, the fabric has to be stretched in order to insert the tongue into the groove. Once the tongue is completely inserted into the groove, the tension on the cover fabric is lessened. Not only does this appear to be somewhat cumbersome to use, but after repeated use, the reduced tension in the cover fabric might allow the cover to rattle and come loose. Apparently, because of this problem, the Rippberger patent employs a relatively narrow and deep groove in order to aid in the prevention of inadvertent detachment of the cover.

The present invention solves these and other problems associated with the prior art.

SUMMARY OF THE INVENTION

The present invention relates to a versatile apparatus for covering various openings. It involves relatively simple, yet non-obvious, improvements over the prior art wherein a generally L-shaped end plate is attached to a flexible, stretchable cover and in covering the opening, a base of the end plate pivots about a lip portion. By so doing, the cover material need not be stretched in order for the end plate to initially engage the lip portion. Of even greater significance is the fact that when the opening is fully covered, most of the force resulting from the stretching of the cover is directed toward maintaining the cover in the covered position.

It is, therefore, a benefit of the present invention that it provides a novel and improved method and apparatus for covering an opening such as the bed of a pickup.

A second benefit is the provision for a more secure engagement of the frame by the cover and end plate.

An additional benefit of the invention is the ease of engagement and security for continuing engagement of the lip portion with the end plate by use of an angle between the leg and base portions of the end plate which is greater than that of a right angle.

Another benefit of the invention is that by folding over the vinyl coated cover material at the end opposite the end plate, the cover provides its own protective covering for itself when it is in the uncovered state.

Still another benefit of the invention is that the use of cross bars prevent the cover from sagging into the opening.

Still another benefit of the invention is the use of stiffening means such as a fabric stiffener along the side edges of the cover to keep the hook-and-loop fastener strips on the cover and the support structure from engaging until after the end plate has engaged the lip portion.

Still another benefit of the invention is the use of a lock arrangement which automatically locks the cover in the covered position and which can be released by pressing on the top of the cover.

These and various other advantages and features of novelty which characterize the invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 7 is a fragmentary sectional view similar to FIG. 4 but depicting a second embodiment of the invention, wherein the apparatus is shown in a first operative position;

FIG. 8 is a fragmentary sectional view similar to FIG. 7, wherein the apparatus is shown in a second operative position;

DETAILED DESCRIPTION OF THE PREFERRED EMBODIMENT(S)

Figure 1:
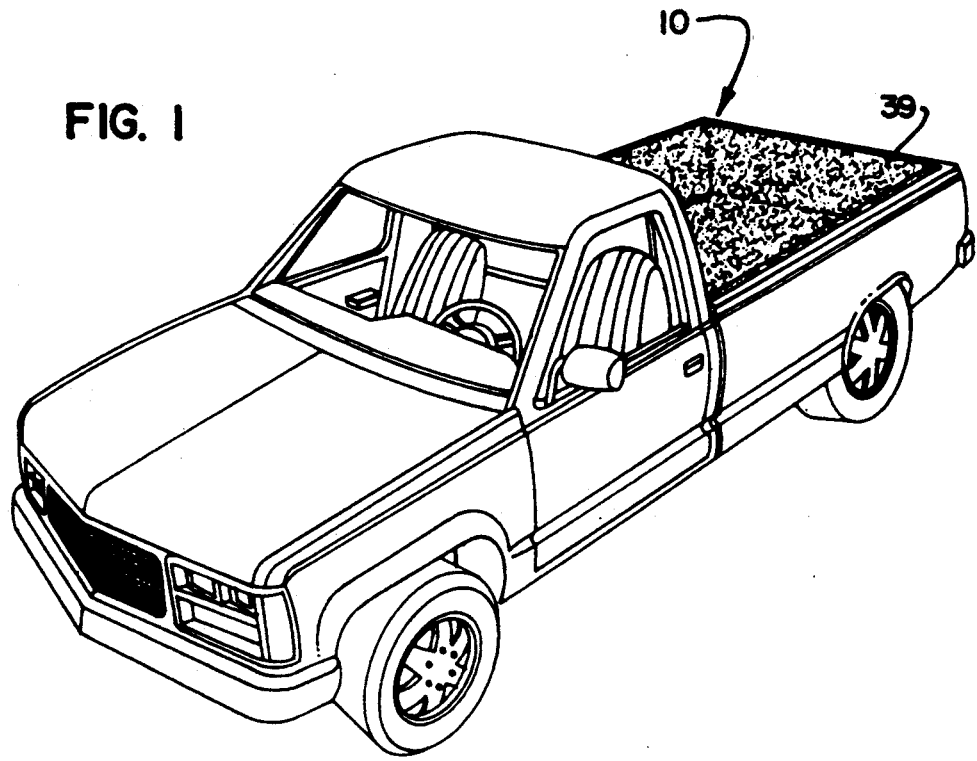
FIG. 1 is a perspective view of an embodiment of a flexible cover in accordance with the principles of the present invention attached to a pickup with the cover being disposed in the covered position.
Figure 2:
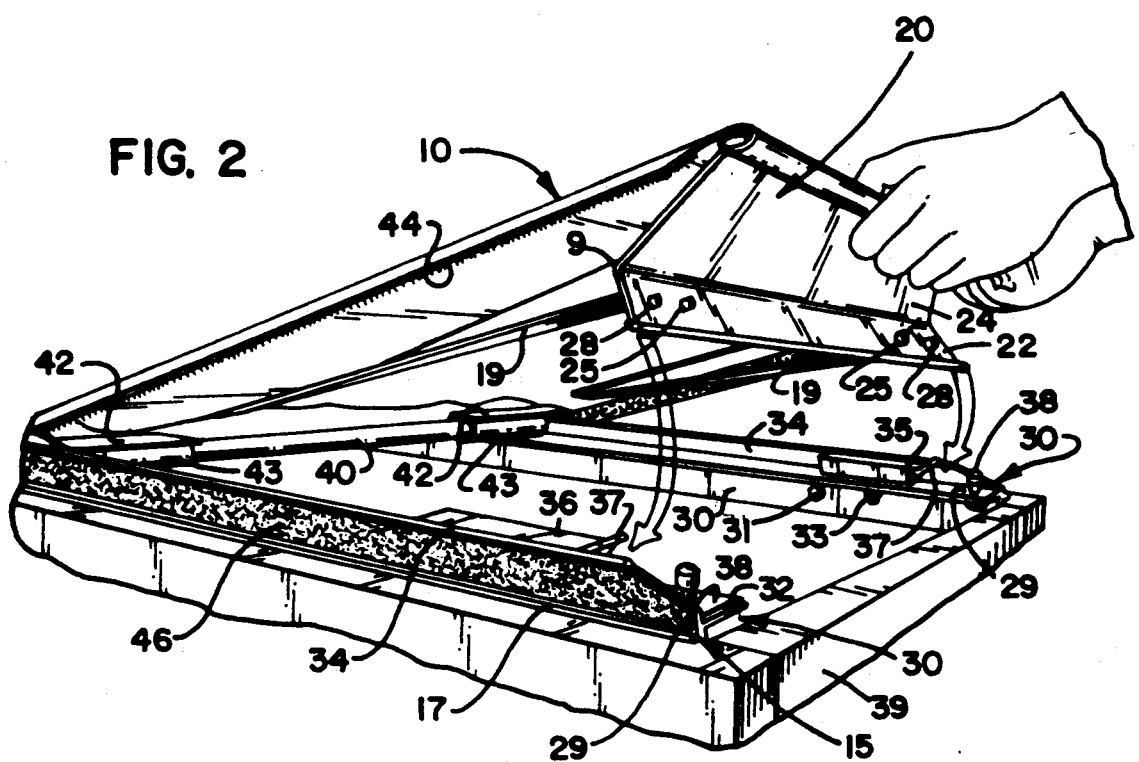
FIG. 2 is a fragmentary perspective view of the embodiment shown in FIG. 1 illustrating operator movement of the end plate toward a lip portion of the frame, and also showing cross bars and semi-flexible plastic members which extend transversely of the pickup bed and aid in supporting the flexible cover.

Referring now to the drawings, there is illustrated a preferred embodiment of the present invention, wherein reference numeral 10 designates the cover. FIG. 1 illustrates the cover 10 in use on the bed of a pickup truck. FIG. 2 shows the flexible, stretchable fabric cover 10 attached to a substantially rigid, extruded aluminum, end plate 20 which comprises a base portion 22 and a leg portion 24 interconnected so as to form an end plate having a generally L-shaped cross section. Although, in the preferred embodiment shown, the end plate is a continuously extruded L-shaped plate, it will be appreciated that only selected portions of the end plate 20 might include a leg portion 24 and a base portion 22. Furthermore, the end plate 20 might have other configurations; e.g., the end plate 20 might have a somewhat T-shape where the base portion 22 is the top of the T and the leg portion 24 is the vertical stem of the T. In the embodiment shown, the cover 10 includes a hem 11 including a cord member 13 which is inserted in the hem 11, . the hem 11 being inserted and retained in a channel 21 at the distal end of the end plate 20 facing away from the tailgate 39. In alternate embodiments, the cover 10 might be attached to the leg portion 24 intermediate the base portion 22 and the distal end of the leg portion 24.

Figure 4:
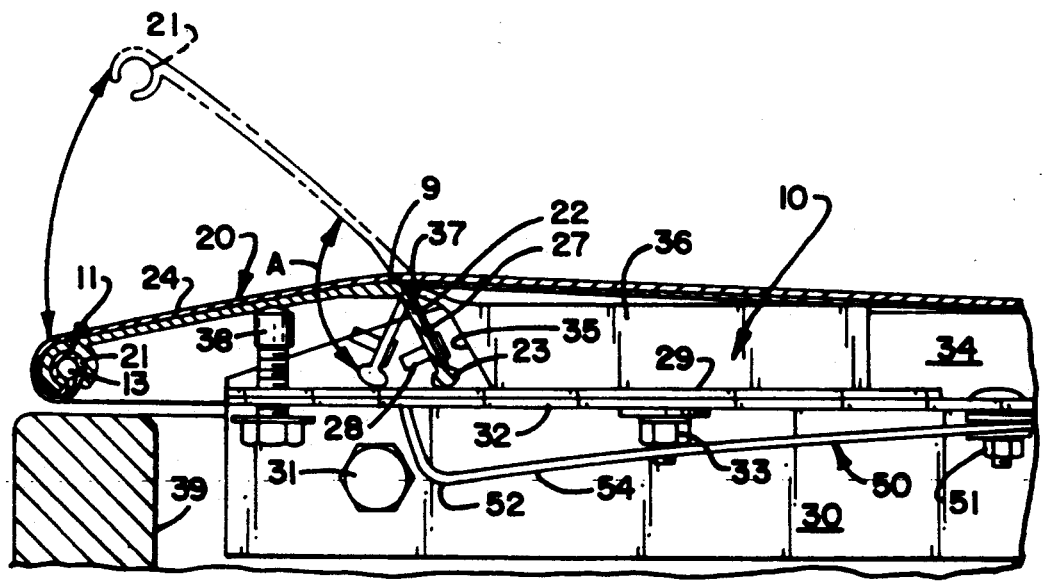
FIG. 4 is an enlarged fragmentary sectional view as seen generally along line 4—4 of FIG. 3 which illustrates the end plate in a fastened position and illustrates in phantom line the end plate in an unfastened position where it first engages the lip portion of the frame.

FIG. 2 also illustrates a support frame structure 30 fastened by fasteners 31 to an inside upper edge of the pickup bed and comprising an L-shaped horizontally extending longitudinal base portion 32, and a raised longitudinal portion 34 extending above and inclined toward the pickup bed. The portion 34 forms a bottom shelf portion 15 which rests on top of the pickup bed side walls, a foam padding 17 being adhesively attached to the shelf portion 15. Members 36 having an inclined portion 35 and a lip portion 37 are suitably fastened to the support frame structure 32 by fasteners 33 proximate the back end of the pickup bed. As illustrated in FIGS. 2 and 4, when covering the pickup bed, the base portion 22 of the end plate 20 is placed by the operator to engage the lip portion 37 of the member 36. The lip portion 37 functions as a pivot about which the end plate 20 pivots. The inclined portion 35 provides a cavity/recess for the base portion 22 to pivot into. It will be appreciated that numerous frame structures might be used in accordance with the principles of the present invention. Indeed, in some applications, a separate frame structure might not be present. For example, the pickup bed itself might serve as the frame.

The cover 10 is suitably attached to a front end of the pickup bed by a frame member 11 such that the cover 10 can be rolled up and secured proximate the front end of the pickup bed in an uncovered state when not in use.

Figure 3:
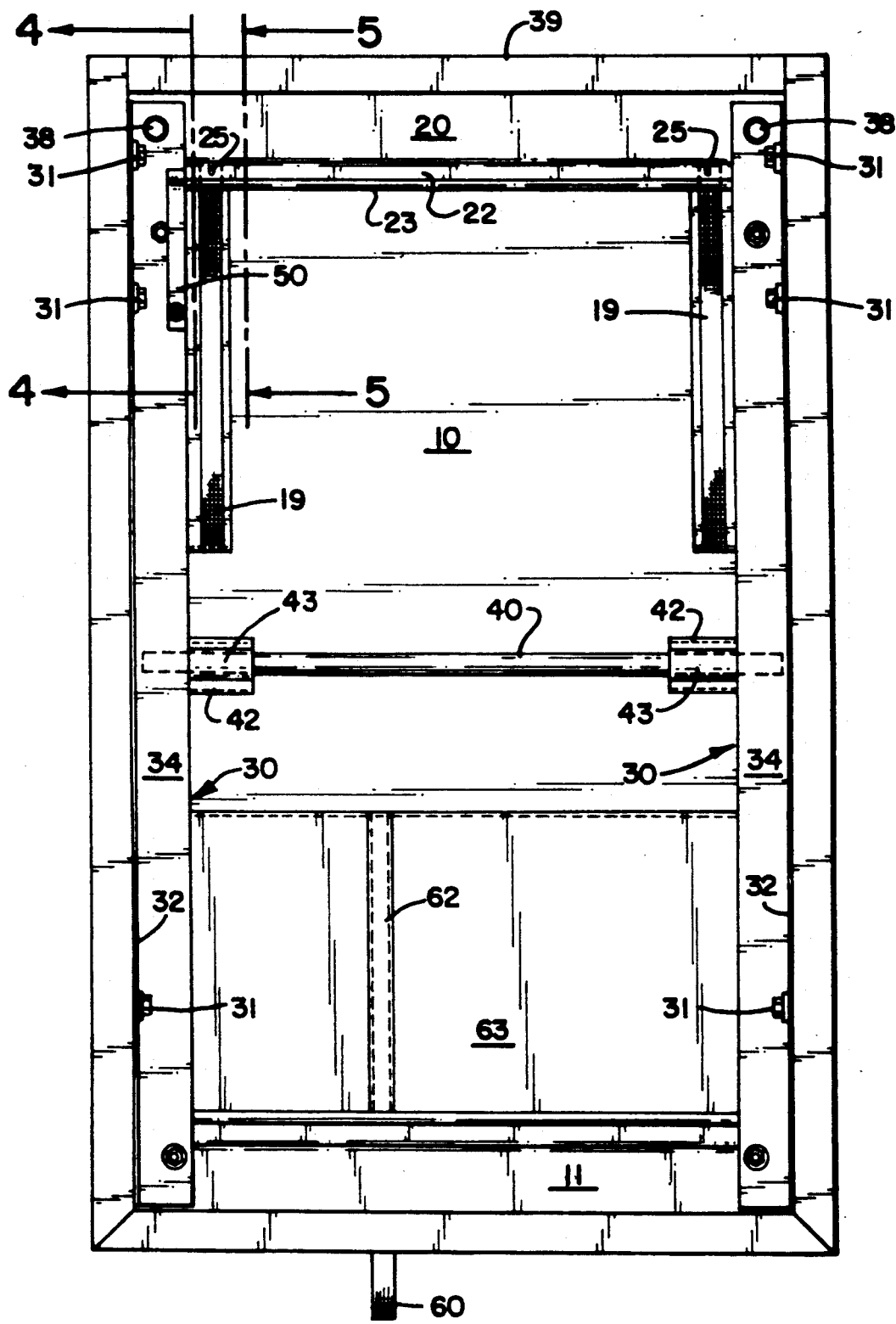
FIG. 3 is a bottom plan from underneath the cover which shows the support frame and flexible cover in the covered position.

FIG. 3 is a view of the cover 10 shown in FIGS. 1 and 2 from underneath.

FIG. 4 illustrates the act of completing the covering of the pickup bed opening. In that figure, the end plate 20 and the cover 10 have been unrolled and the base portion 22 of the end plate 20 is shown in phantom line engaging the lip portion 37 in an unfastened position. In the unfastened position, the cover 10 is not stretched tight and is loose. The leg portion 24 of the end plate 20 is then depressed by the user and pivoted downward, until as shown in FIG. 4, the leg portion 24 comes to rest on a stop 38 in the fully fastened position. When going from the unfastened to the fastened position, the end plate 20 stretches the cover 10 tight and fastens the cover 10 in the covered position. In that position, the base portion 22 is securely seated in the cavity/recess under the inclined portion 35. The act of depressing the leg portion 24 against the stop 38 also stretches the cover 10 which creates a force along the length of the cover 10 and which thereby facilitates maintaining the base portion 22 under the inclined portion 35 in the fastened position. In the fastened position, the stretched cover 10 also forces down on the end plate 20 proximate the intersection of the leg and base portions which forms a peak/crest 9 along the end plate 20 which is the highest point of the end plate 20. As illustrated in FIG. 4, the base portion 22 includes an enlarged ridge 23 which comes into contact with a plastic wear surface 29 of the frame 30 as the end plate 20 is pivoted into the fastened position. In some embodiments, the base portion 22 may actually be made to deflect somewhat as the ridge 23 comes into contact with the wear surface 29. In the preferred embodiment, the end plate 20 is deflected upward slightly as the ridge 23 swipes across the surface 29. After the ridge 23 swipes across the surface 29, the downward force exerted by the cover 10 forces the base portion 22 down onto the surface 29. This is facilitated by the inclined surface of the base portion 22 intersecting with the lip portion 37. The ridge 23 cooperates with the surface 29 to assist in maintaining the end plate 20 in the fastened position by providing resistance to upward pivoting of the end plate. Also, in the preferred embodiment shown, the end plate 20 includes a wear plate 27 attached by fastener 28 to the base portion 22 so as to make contact with the lip portion 37 during the pivotal motion. When the end plate 20 is fully depressed into the fastened position, it generates an audible feedback as it hits the stops 38 which lets the user know the cover is securely closed. In the preferred embodiment shown, the end plate 20, assisted by the tension force of the cover 10, literally snaps into place.

As illustrated in FIG. 4, the angle A between the leg portion 24 and the base portion 22 of the end plate 20 is greater than 90 degrees. From an operational standpoint, this particular configuration has several advantages. Because of the angle A, when the base portion 22 cooperatively engages the lip portion 37, the cover 10 is not stretched at that point in time, thereby reducing wear on the cover 10 and permitting ease of cooperative engagement. In addition, when the leg portion 24 abuts the stop 38, then because of the angle A, the base portion 22 is inserted further under the inclined portion 35. This permits additional safety, in that more force is required in order for the base portion 22 to be removed from the fully fastened position. As illustrated in FIG. 4, when in the closed or latched position, the leg portion 24 of the end plate 20 is inclined downwardly and substantially covers the tailgate 39 of the pickup. The stops 38 provide sufficient clearance for the tailgate 39 to be open without having to open the cover 10. In alternate embodiments of the invention, the stops 38 need not be present. By being inclined downwardly, the end plate 20 resists forces due to wind or jarring of the pickup which might tend to pivot the leg portion 24 upward and thus unfasten the cover. This is accomplished at least in part, by the design of the end plate 20 which converts any such forces to a generally downward force on the crest 9 of the end plate 20, thereby increasing resistance between the ridge 23 and the surface 29. As noted above, the ridge 23 engages the surface 29 to resist opening or pivoting of the end plate 20. In alternate embodiments, the wear surface 29 might be replaced by other surfaces such as the sides of the pickup bed.

In the preferred embodiment, the cover 10 is attached to the end plate 20 by straps 19 attached at one end to the bottom of the cover 10 and at the other end to the base portion 22 of the end plate 20 proximate the front end of the end plate 20 by suitable fasteners 25. By having the cover 10 strapped to the front end of the end plate 20 and attached to the back end of the end plate 20, as the end plate 20 is rolled with the cover, the straps eliminate an additional fold. If the cover were attached only to the back end of the end plate 20, on the very first fold there would be no cover 10 being folded since in typical use the end plate 20 will be rolled over the top of the cover 10. However, in the embodiment shown, on the very first fold, the cover 10 is folded with the end plate 20 so as to thereby reduce the total number of folds required by one. Additionally, when unrolling the cover 10 into the covered position, this arrangement prevents the end plate 20 from hitting the tail gate 39. It will be appreciated that in alternate embodiments this feature need not be present.

Also illustrated in FIGS. 2 and 3 are cross bars 40 and semi-flexible plastic members 42. The cross bars 40 extend transversely of the pickup bed and prevent the cover from sagging into the opening by resting on the frame 32 and aid in covering and uncovering the opening. The cross bars 40 are retained in sleeves 43 sewed onto the bottom of the cover 10. When the cover 10 is initially placed over the frame 30, the semi-flexible plastic members 42 extend beyond the ends of the sleeves 43 and hold up the edges of the cover so as to help prevent hook-and-loop fastener 44, disposed along the side edges of the cover, from engaging with cooperating hook-and-loop fastener 46 disposed along the sides of the frame 34. Hook-and-loop fasteners 44 and 46 might be VELCRO ®. It will be appreciated that in alternate embodiments, the fasteners might be any suitable type such as hook and hook material, other self-adhesive material, magnetic tape on steel, tongue and groove, etc. In yet other embodiments, fasteners might not be used.

In the embodiment shown, the semi-flexible plastic members 42 are an integral part of the sleeves 43 and extend beyond the end of the sleeves. By holding up the outer edges of the cover 10, the sleeves 43 and semi-flexible plastic members 42 permit the cover to be stretched and fastened before the hook-and-loop fasteners 44 and 46 are engaged to one another. To securely engage the hook-and-loop fasteners 44 and 46, the user simply walks along the sides of the pickup and forces the side edges of the cover 10 down onto the frame 34 such that the hook-and-loop fasteners 44 and 46 engage. This eliminates the necessity of continually having to adjust the engagement of the hook-and-loop fasteners 44 and 46 when covering the opening and allows uniform stretching of the cover 10 since the end plate 20 can be pivoted into the fastened position without the hook-and-loop fasteners 44 and 46 being yet engaged.

Figure 5:
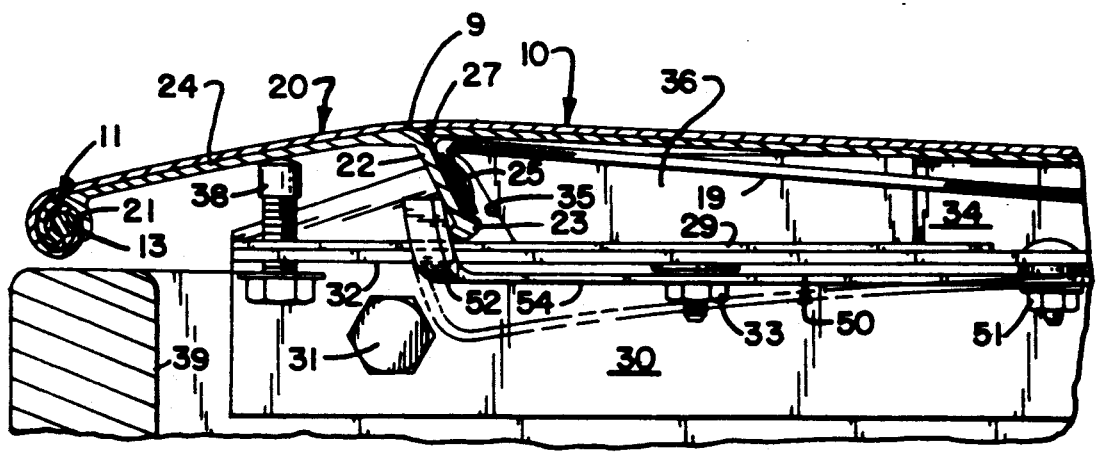
FIG. 5 is an enlarged fragmentary sectional view as seen generally along line 5—5 of FIG. 3 which shows the cover in the covered position and shows the lock in the latched position where it engages the end plate and shows in phantom line the lock in the stored position.

In the particular embodiment illustrated in FIGS. 4 and 5, a lock element is illustrated. FIG. 4 shows the lock 50 in the storage position. The L-shaped lock 50 is comprised of a base portion 52 and a leg portion 54. The leg portion 54 is pivotally attached by member 51 beneath the base of the frame 30. The lock 50 is under tension in its stored position such that when pivoted away from the frame 30, the lock 50 springs upward and engages the base portion 22 of the end plate 20. When the lock 50 is in its locked position, the base portion 52 does cooperatively engage the base portion 22 of the end plate 20. In the embodiment shown, the ridge 23 facilitates retention of the lock 50 with the end plate 20. The use of the lock 50 prevents the accidental or deliberate unauthorized uncovering of the cover 10 by a person. By engaging the base portion 22, the base portion 52 of the lock 50 prevents the leg portion 24 of the end plate 20 from pivoting upwardly and releasing the cover 10.

Figure 6:
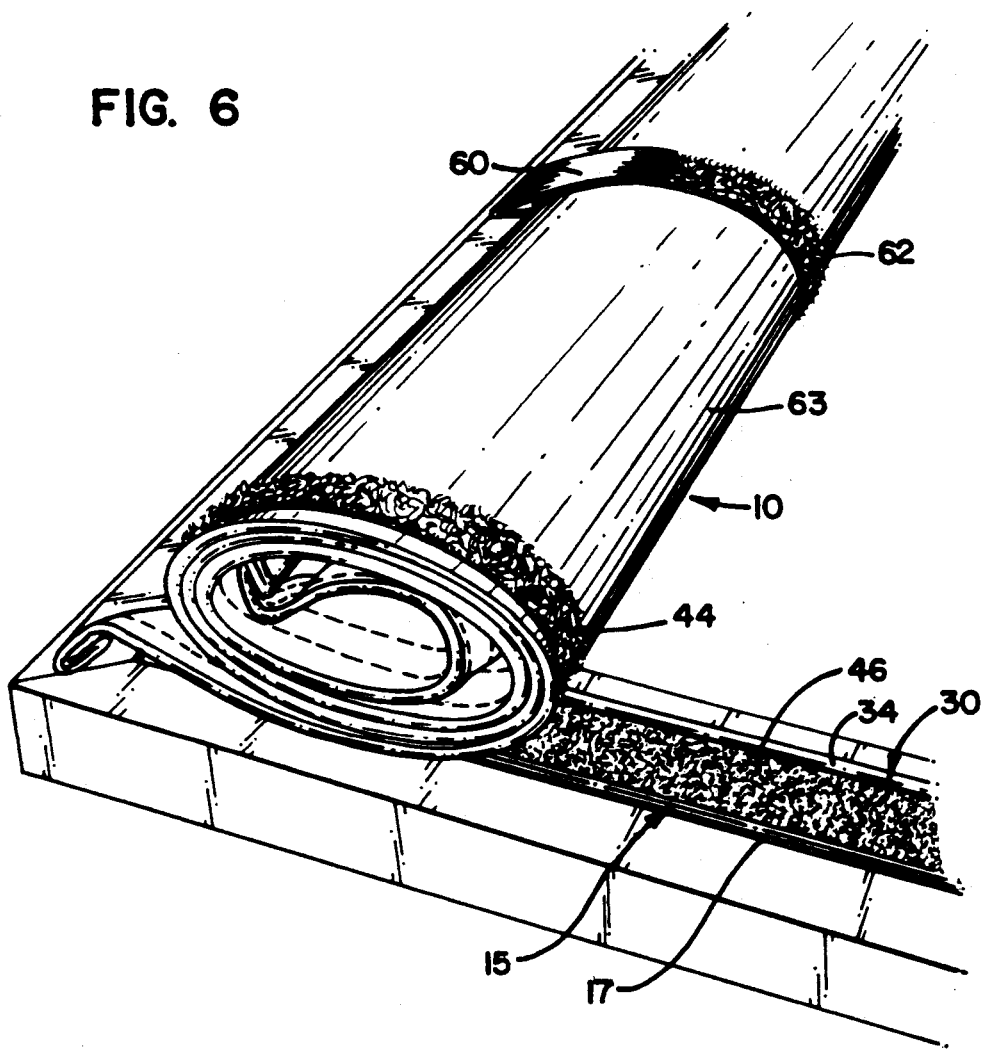
FIG. 6 is a fragmentary perspective view of the cover in the uncovered position illustrating the cover rolled up proximate the front end of the pickup bed.

FIG. 6 illustrates use of a storage strap 60 in an embodiment of the present invention. When the cover is rolled up into the uncovered state, a first hook-and-loop fastener attached to a storage strap 60 is detachably fastened to a second hook-and-loop fastener 62 which maintains the cover 10 rolled up in the uncovered state. In the particular embodiment shown is FIG. 3, the storage strap 60 is positioned closer to one longitudinal side of the cover 10. This permits the engagement and release of the storage strap 60 to be accomplished by the user from one side of the vehicle.

The top of the cover 10 in the preferred embodiment has a vinyl coating 63 to keep out water. In the embodiment shown, the cover 10 is folded transversely back on itself proximate the front end of the pickup bed such that the vinyl coating 63 extends around the underside of the cover 10 as is illustrated in FIG. 3. When the cover 10 is rolled up, the vinyl coating 63 on the underside of the cover 10 encircles the rolled cover 10 so as to protect the cover 10 from the elements.

Referring now to FIGS. 7-14, a second preferred embodiment of the invention will now be described. As is best shown in FIGS. 7 and 8, the second embodiment 110 of the invention includes a cover 112 which is provided with a vinyl coating on each of its two surfaces. The double coating provides for less shrinkage during use, a higher tear strength than a cover which has only a single surface coated, and will withstand lower temperatures than a single coated cover.

As is also shown in FIGS. 7 and 8, a modified end plate 114 includes a base portion 115 and a leg portion 117. Leg portion 117 is provided with a flat lower surface 116, which is constructed to engage a flat upper surface 158 of the support frame structure 30 when the cover apparatus is in its locked position. In this way, the modified end plate 114 and its flat lower surface 116 obviates the need for additional stop members, such as the stop members 38 which are provided in the embodiment of FIG. 5. A sealing gasket 118 is provided on a distal portion of the flat lower surface 116, for sealingly engaging an upper surface of the tailgate 39.

As is further shown in FIGS. 7 and 8, an improved locking arrangement 120 is provided for automatically locking the end plate 114 into a fixed, stretching position with respect to the support frame structure 30. Locking arrangement 120 preferably includes a pawl element 122 which is constructed and arranged to engage the enlarged ridge 23 on the base portion 115 of the modified end plate 114. A flexible leaf spring 124 is cantilevered with respect to the support frame structure 30 by a connector 127, as is shown in FIG. 7. Pawl 122 is connected to the end of leaf spring 124 which in turn is connected to support frame structure 30. As a result, leaf spring 124 biases pawl 122 toward the base portion 115 of the modified end plate 114 so as to automatically engage the ridge 23 of the end plate 114 upon pivoting the end plate 114 downward so as to close the cover such that the cover 114 is automatically locked in the closed position. The locking arrangement 120 further includes an upright member 134 attached to the leaf spring 124 by a bolt 136 for releasing the pawl element 122 from the ridge 23 upon being pressed downward as illustrated by the arrow in FIG. 8. Since an upper end of the upright member 134 is adjacent the cover 112, an operator can simply push down on the cover 112 in an area vertically aligned with the upright member 134 so as to release the locking arrangement 120. This allows the cover 112 to be opened without having to open the tailgate 39.

In the embodiment which is illustrated in FIGS. 7 and 8, connector 127 includes an adjustment bolt 126 having a head 128, a stud 130 and an adjustable nut element 132. Adjusting the connector 127 allows the pawl to be moved back and forth for proper alignment with the ridge 23.

Figure 9:
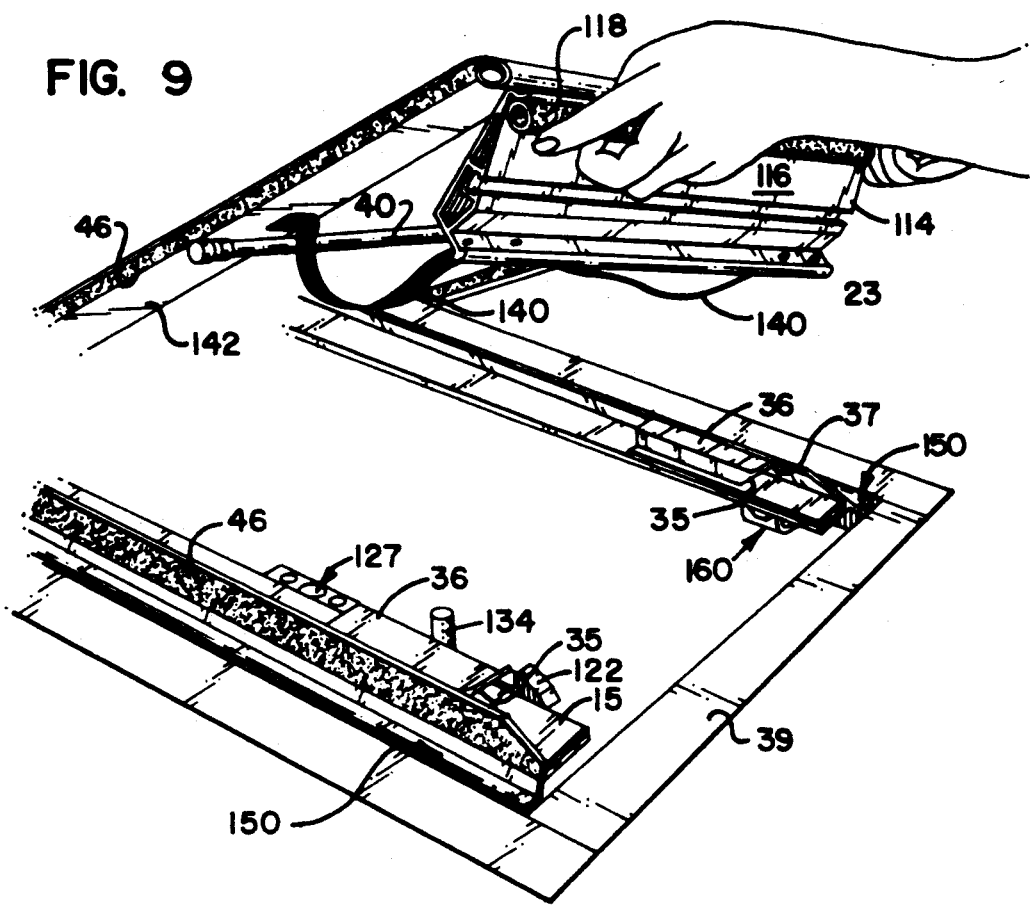
FIG. 9 is a fragmentary perspective view showing a flexible cover constructed according to the embodiment of FIGS. 7 and 8 being removed from a pickup bed.
Figure 13:
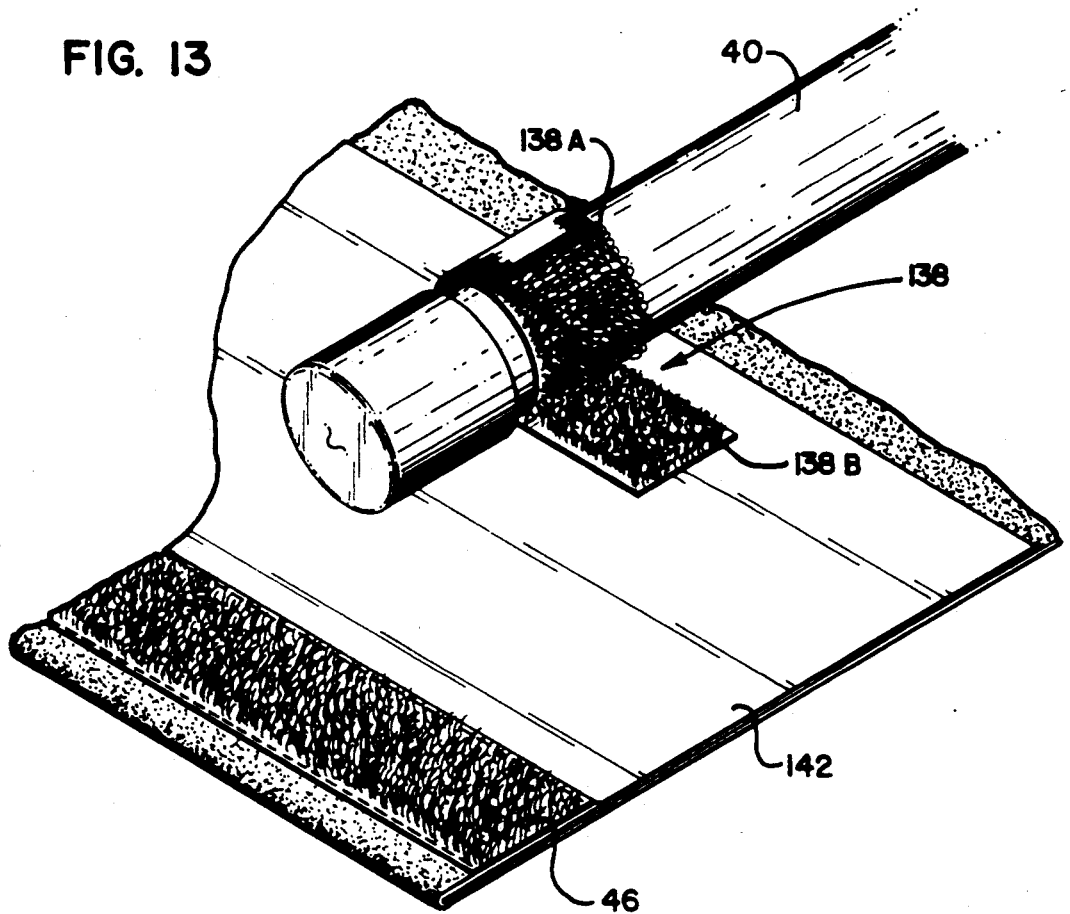
FIG. 13 is an enlarged partial view illustrating an embodiment of a hook and loop fastener arrangement used to attaching crossbars to the cover.
Figure 14:
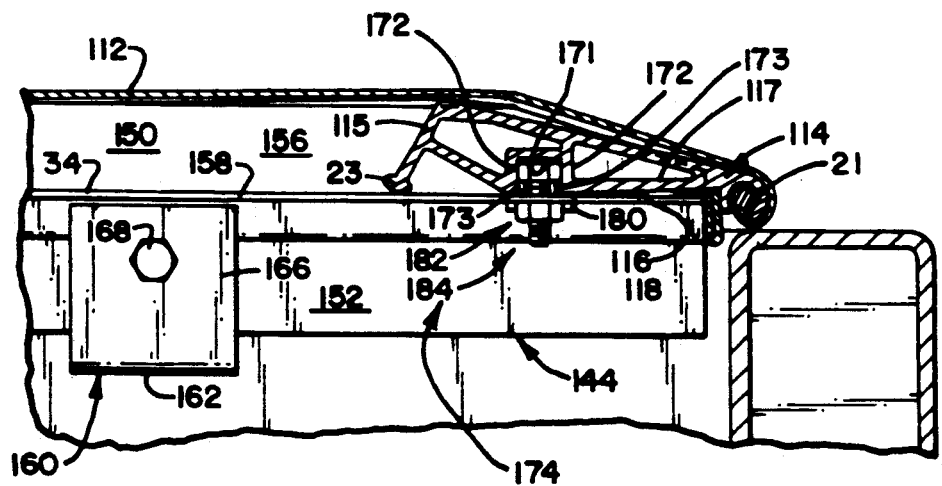
FIG. 14 is a partial sectional view of the front end plate.

Referring now to FIGS. 9 and 13 of the drawings, the second embodiment of the invention includes a plurality of crossbars 40 that extend across almost the entire width of the cover 112. The crossbars 40 are attached to the cover 112 proximate their ends by a hook and loop fastener arrangement 138. The hook and loop fastener arrangement 138 includes a loop material 138a adhesively attached to the crossbars 40 and a hook material 138b sewn to the cover 112. The hook material 138b is sewn proximate its midsection so that its end portions are free to wrap around the loop material 138a on the crossbars 40. Each end portion will circumvent roughly half the circumference of the loop material 138a. Thus the sewn portion of the hook material 138b will be disposed intermediate the end of each of the crossbars 40 and the cover 112 when the crossbars are attached to the cover. This facilitates retaining the crossbars 40 in place.

The crossbars 40 support the cover 112 during use. Straps 140 connect the cover 112 to the end plate 114, as is also shown in FIG. 9. Of course, the straps might also be attached to the crossbars 40. The straps 140 facilitate positioning of the end plate 114 relative to the lip portion 37 of the members 36. The straps 140 facilitate folding of the cover 112 onto the end plate 114.

Figure 10:
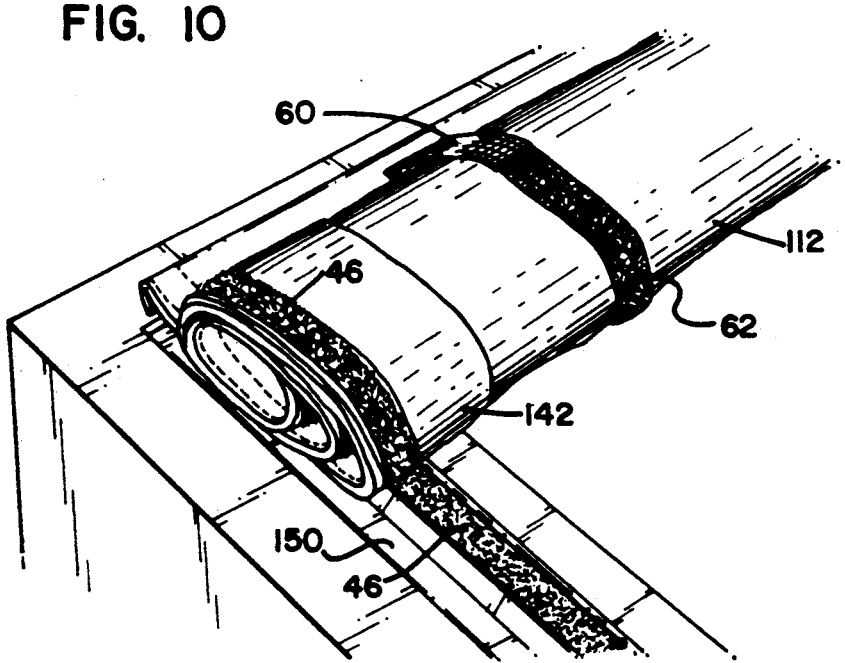
FIG. 10 is a fragmentary perspective view of a cover constructed according to the embodiment of FIGS. 7-9, illustrating the cover rolled up proximate the front end of the pickup bed.

Looking now to FIG. 10, another feature of the second embodiment of the invention is the provision of a heavy fabric stiffener 142 which is sewn along each side of the cover 112 adjacent to the hook and loop fasteners 46. In the embodiment shown, the fabric stiffener 142 is roughly four inches wide and extends substantially the full length of the cover 112. The fabric stiffener 142 stiffens the sides of the cover 112 so as to facilitate holding the loop material 46 along the sides of the cover 112 away from the hook material 46 on the support structure so as to prevent inadvertent engagement of the hook and loop fastener 46 prior to stretching the cover 112 lengthwise of the truck bed during the covering process. Once the cover 112 is stretched and secured with the end plate 114, the user then goes along the sides of the cover 112 and presses the sides of the cover 112 onto the support structure so as to engage the hook and loop fastener 46 and thus secure the sides of the cover 112.

In the preferred embodiment of the invention, the straps 140 are sewn onto the fabric stiffener 142 as well. In addition, the hook material 138b is also sewn onto the fabric stiffener 142.

Figure 11:
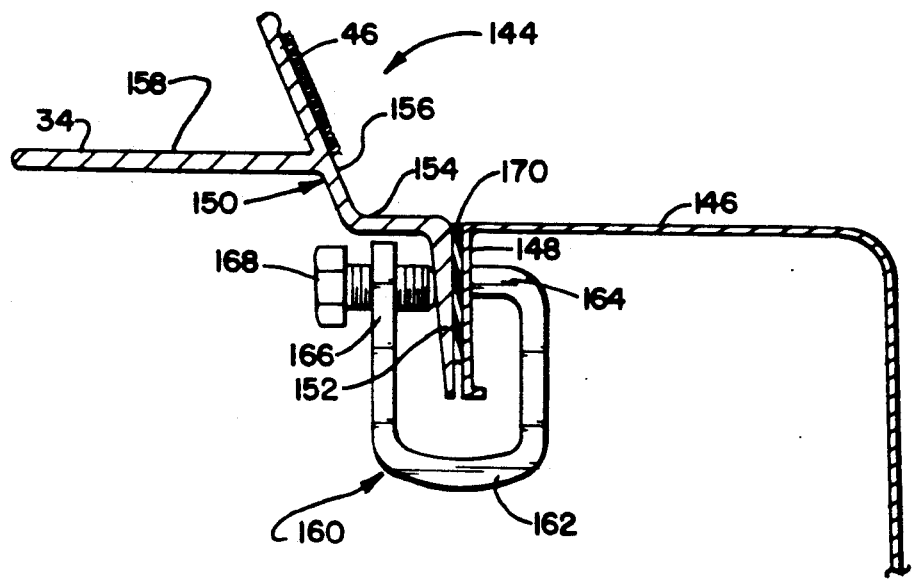
FIG. 11 is a first cross-sectional view depicting how a cover constructed according to the second embodiment of the invention is mounted to a frame of a pickup bed.
Figure 12:
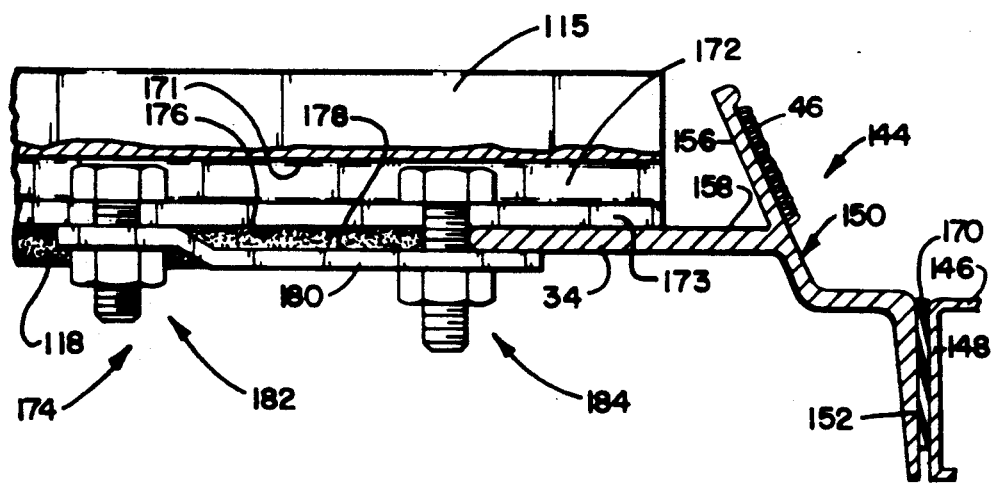
FIG. 12 is a second cross-sectional view depicting an improved mounting arrangement for a front end of the cover, which is provided in the second embodiment of the invention.

FIG. 11 illustrates the connection of a modified support frame 144 to the box 146 of a pickup truck or equivalent structure. As may be seen in FIG. 11, the box 146 of a pickup truck commonly has an inside wall 148. The modified support frame 144 includes a side rail 150 having a lower vertical portion 152, a horizontal inwardly extending portion 154, an inclined portion 156 which supports the hook and loop fastener strip 46, and a raised longitudinal portion 34, which has a flat upper surface 158. According to the second embodiment of the invention, a C-type clamp 160 is used to secure the lower, vertical portion 152 of side rail 150 to the inside wall 148 of the pickup truck box 146. C-type clamp 160 includes a C-shaped element 162 having a first clamping end 164 and a second end 166 through which a clamping bolt 168 is threaded. A resilient pad 170 may be positioned between the inside wall 148 of box 146 and the outer surface of vertical side rail portion 152, as is shown in FIG. 11. By turning bolt 168 in a first direction, side rail 150 may be clamped to box 146. Those two elements may be disconnected by turning bolt 168 in a second, opposite direction. Several of the C-type clamps may be provided along the length of side rail 150 for a secure connection to the box 146 of a pickup truck.

In the preferred embodiment the same plate configuration is used for both the end plate and the front plate to attach the cover 112 to the front of the pickup truck box 146. Both of the plates 114 are made of extruded aluminum in the preferred embodiment. Looking now to FIGS. 12 and 14, an improved connecting arrangement 174 for connecting the front end plate of the cover assembly to the side rail 150 of frame 144 will now be discussed. The end plate 114 includes a channel 171 having vertical walls 172 and a two horizontal walls 173 separated by a groove or opening. According to the second embodiment of the invention, a lower surface 176 of horizontal walls 173 act in conjunction with an upper clamping surface 178 of a cantilevered clamp element 180 to securely clamp the raised longitudinal portion 34 of side rail 150. The cantilevered clamp element 180 is secured to the lower surface 176 by means of a mounting nut and bolt assembly 182. An adjustment nut and bolt assembly 184 passes through the cantilevered clamp element 180 and is inserted into the channel 171 for urging the cantilevered clamp element 180 toward the surface 176 upon tightening of the bolt assembly, which causes the raised longitudinal portion 34 of side rail 150 to be securely clamped between surfaces 176, 178. A clamping arrangement 174 is provided on each side of the front end plate 114, so that the front end plate 114 may be connected to each of the side rails 150 in an adjustable manner which allows for transverse movement of the front end plate 114 so as to facilitate alignment and which allows for longitudinal movement along the frame 144 so as to facilitate adjustment of the cover tension.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A cover apparatus for covering an opening defined in a structure, such as the bed of a pickup, the apparatus being configurable in an uncovered state wherein the opening is uncovered and a covered state wherein the opening is covered, the apparatus comprising:
    a stretchable cover having a longitudinal axis and a transverse axis, a front end and a back end, and two spaced apart longitudinally extending opposite side edges;
    a frame fixedly positionable about the opening;
    a first fastener disposed on a downwardly facing surface, continuously along substantially the entire length of the opposite side edges of said cover;
    a second fastener disposed on an outwardly facing surface, continuously along substantially the entire length of opposite sides of said rigid frame and detachably fastenable to said first fastener of said cover when said cover is in the covered state, said surface on which said second fastener is disposed being inclined upwardly toward a central longitudinal axis of the cover extending from the back end of the cover to the front end of the cover;
    attachment means for attaching the cover to a front end of the opening;
    means attached to said back end of said cover for stretching said cover and for releasably securing said back end of said cover to said frame;
    stiffener means for holding up the side edges of the cover during the covering process so that the first fastener does not engage the second fastener during the stretching process;
    means for locking said stretching means into a fixed, stretching position with respect to said frame; and
    means for releasing said locking means so that said cover may be removed from its position over the opening, said releasing means being hand-actuable, thereby not requiring any special tools to release the cover.

2. An apparatus according to claim 1, wherein said stretching means comprises a stretching element including an end plate having a base portion and a leg portion, said leg portion being attached to said back end of said cover, said base portion being on an opposite side of said leg portion from said cover, the frame including a lip portion facing the base portion of the end plate and cooperatively engageable with the base portion of the end plate as the end plate is pivoted about a stationary pivot point between an unfastened position and a fastened position, thereby stretching and fastening said cover in the covered state.

3. An apparatus according to claim 2, wherein said leg portion has a flat lower surface for contacting said frame when said end plate is in the fastened position.

4. An apparatus according to claim 3, further comprising a sealing gasket provided on said leg portion for sealing against structure which defines the opening, such as the tailgate of a pickup.

5. Apparatus according to claim 1, wherein said locking means comprises a pawl element for engaging said stretching means and holding said stretching means in a fastened position; and a means for biasing said pawl element toward said stretching means.

6. Apparatus according to claim 5, wherein said biasing means comprises a leaf spring.

7. Apparatus according to claim 5, wherein said releasing means comprises means for moving said pawl element away from said stretching means against said biasing means when the operator applies a downward force through said cover.

8. Apparatus according to claim 7, wherein said moving means comprises a plunger finger which is positioned just beneath a lower surface of said cover.

9. Apparatus according to claim 1, wherein said cover is a double-coated fabric.

10. An apparatus in accordance with claim 1, wherein a plurality of cross bars extend transversely of the cover and are attached to a bottom surface of the cover.

11. An apparatus according to claim 10, wherein said cross bars are attached to said cover by a hook and loop assembly.

12. An apparatus in accordance with claim 10, wherein the side edges of the cover are stiffened to assist in holding up the side edges of the cover during the covering process.

13. An apparatus in accordance with claim 1, wherein the frame is positionable proximate a top inner edge portion of the opening, the frame having a cover attaching surface inclined upwardly toward a center longitudinal axis of the cover.

14. An apparatus in accordance with claim 1, wherein the cover is also attached to said stretching means by a plurality of straps.

15. An apparatus according to claim 1, further comprising stiffening means for stiffening the sides of said cover.

16. An apparatus according to claim 15, wherein said stiffening means comprises a strip of heavy fabric attached to said cover proximate the sides of the cover.

17. An apparatus according to claim 1, further comprising means adapted for connecting said frame to the structure which defines the opening, said connecting means comprising at least one C-type clamp.

18. An apparatus according to claim 1, wherein said attachment means comprises a front bar to which said front end of said cover is connected, and means for mounting said front bar to said frame.

19. An apparatus according to claim 18, wherein said mounting means comprises a pair of clamps on said front bar for clamping onto said frame.

20. A cover apparatus for covering an opening defined in a structure, such as the bed of a pickup, the apparatus being configurable in an uncovered state wherein the opening is uncovered and a covered state wherein the opening is covered, the apparatus comprising:
- a stretchable cover having a longitudinal axis and a transverse axis, a front end and a back end, and two spaced apart longitudinally extending opposite side edges;
- a frame fixedly positionable about the opening;
- a first fastener disposed on a downwardly facing surface, continuously along substantially the entire length of the opposite side edges of said cover;
- a second fastener disposed on an outwardly facing surface, continuously along substantially the entire length of opposite sides of said rigid frame and detachably fastenable to said first fastener of said cover when said cover is in the covered state, said surface on which said second fastener is disposed being inclined upwardly toward a central longitudinal axis of the cover extending from the back end of the cover to the front end of the cover;
- attachment means for attaching the cover to a front end of the opening;
- means attached to said back end of said cover for stretching said cover and for releasably securing said back end of said cover to said frame, said means including a generally L-shaped end plate having a base portion and a leg portion, the back end of the stretchable cover being permanently attached along a back edge of the leg portion, the base portion pivotally engageable with a protruding stationary lip portion of the frame such that upon forcing down on the leg portion the base portion is made to pivot toward the front end of the cover under the stationary lip portion thereby stretching and fastening the back end of the cover;
- stiffener means disposed proximate the opposite side edges of said cover for preventing the first and second fasteners from contacting each other during stretching of the cover.

21. A cover apparatus for covering an opening defined in a structure, such as the bed of a pickup, the apparatus being configurable in an uncovered state wherein the opening is uncovered and a covered state wherein the opening is covered, the apparatus comprising:
- a stretchable cover having a longitudinal axis and a transverse axis, a front end and a back end, and two spaced apart longitudinally extending opposite side edges;
- a frame fixedly positionable about the opening;
- a first fastener disposed along the opposite side edges of said cover;
- a second fastener disposed along opposite sides of said rigid frame and detachably fastenable to said first fastener of said cover when said cover is in the covered state;
- attachment means for attaching the cover to a front end of the opening; and
- means attached to said back end of said cover for stretching said cover and for releasably securing said back end of said cover to said frame; said stretching means comprising a stretching element including a generally L-shaped end plate having a base portion and a leg portion, said leg portion being permanently attached to said back end of said cover, said base portion on an opposite side of said leg portion from said cover, the frame including a protruding, stationary lip portion facing the base portion of the end plate and cooperatively engageable with the base portion of the end plate as the end plate is pivoted about a stationary pivot point between an unfastened position and a fastened position, thereby stretching and fastening said cover in the covered state.

* * * * *